United States Patent [19]

Carignan

[11] Patent Number: 5,339,696
[45] Date of Patent: Aug. 23, 1994

[54] BOLT TORQUE AND TENSION TRANSDUCER

[75] Inventor: Forest J. Carignan, Bedford, Mass.

[73] Assignee: Advanced Mechanical Technology, Inc., Watertown, Mass.

[21] Appl. No.: 40,631

[22] Filed: Mar. 31, 1993

[51] Int. Cl.⁵ .............................................. G01L 5/10
[52] U.S. Cl. .................... 73/862.041; 73/761
[58] Field of Search ........ 73/9, 761, 862.041–862.046, 73/862.05, 862.06, 862.191, 862.321, 862.325, 862.337–862.339, 862.49, 862.627, 862.635, 862.642

[56] References Cited

U.S. PATENT DOCUMENTS

| 3,460,382 | 8/1969 | Schultheis, Jr. | 73/862.635 |
| 3,623,360 | 11/1971 | Paine | 73/761 |
| 3,864,966 | 2/1975 | Seitz | 73/862.627 |
| 4,876,895 | 10/1989 | Kao | 73/761 |

FOREIGN PATENT DOCUMENTS

| 63-304125 | 12/1988 | Japan | 73/862.627 |
| 1189536 | 7/1989 | Japan | 73/862.041 |
| 610583 | 6/1978 | U.S.S.R. | 73/862.044 |

OTHER PUBLICATIONS

"Three Torque and/or Tension Testing Systems and Services to Choose From", NewAge Industries, Testing Instruments Division, 2300 Maryland Road, Willow Grove, Pa. 19090, (Jan. 1991).

"Torque Tension Technology", GSE Inc., 23640 Research Drive, Farmington Hills, Mich. 48024-1090, St. C86445M1089 (1989).

Bill Leventon, "Testing Machine Simulates Bolt-Tightening Strategies", *Design News*/Sep. 23, 1991 pp. 119-120.

*Primary Examiner*—Robert Raevis
*Attorney, Agent, or Firm*—Hamilton, Brook, Smith & Reynolds

[57] ABSTRACT

A bolt torque and tension transducer for determining torque and tension on a bolt includes a pair of nested concentric sensing elements. The inner sensing element measures tension on a bolt as well as the thread torque required to tighten the nut on the bolt. The outer sensing element measures the applied torque to the bolt.

27 Claims, 7 Drawing Sheets

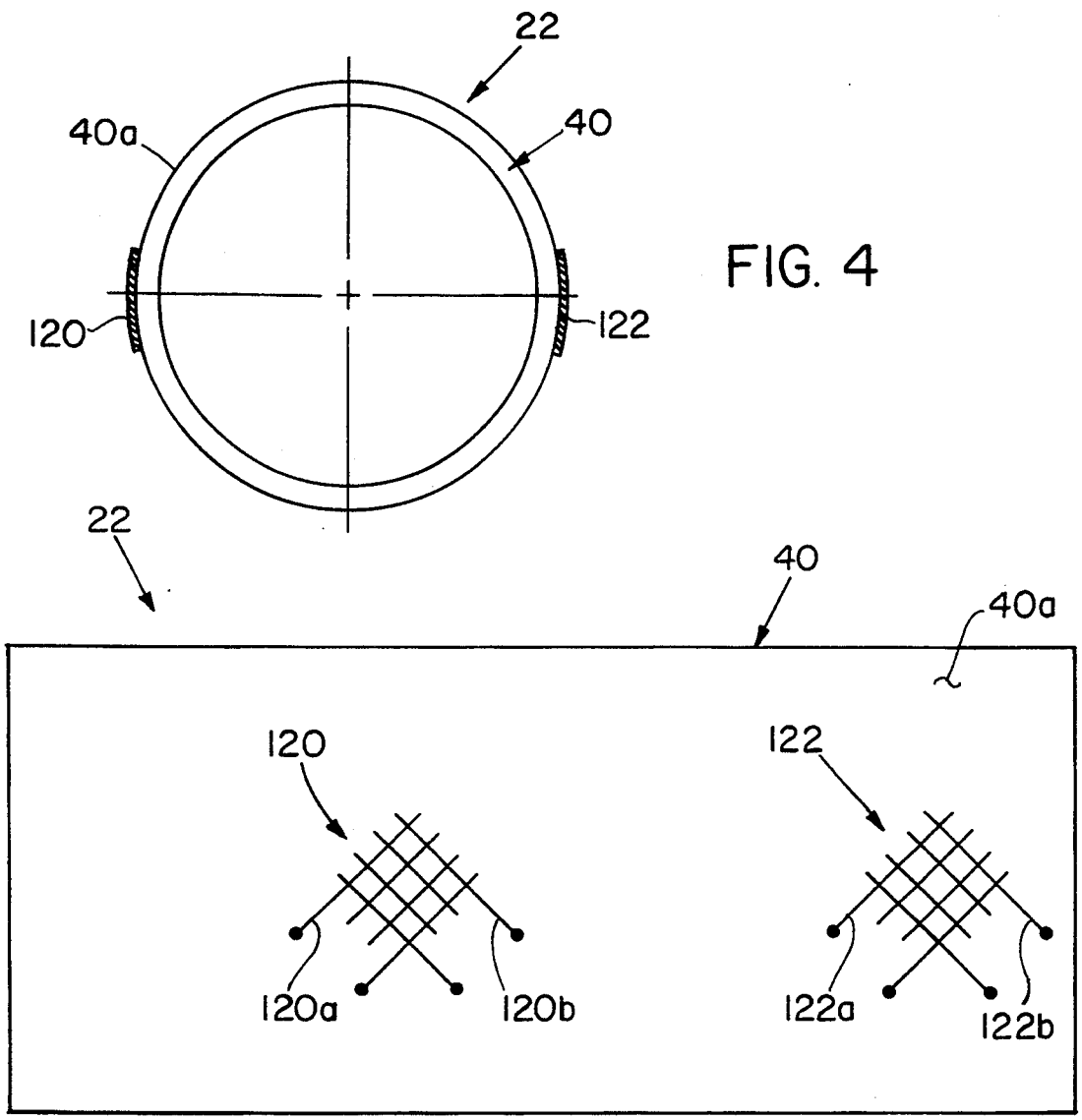
FIG. 4
FIG. 5
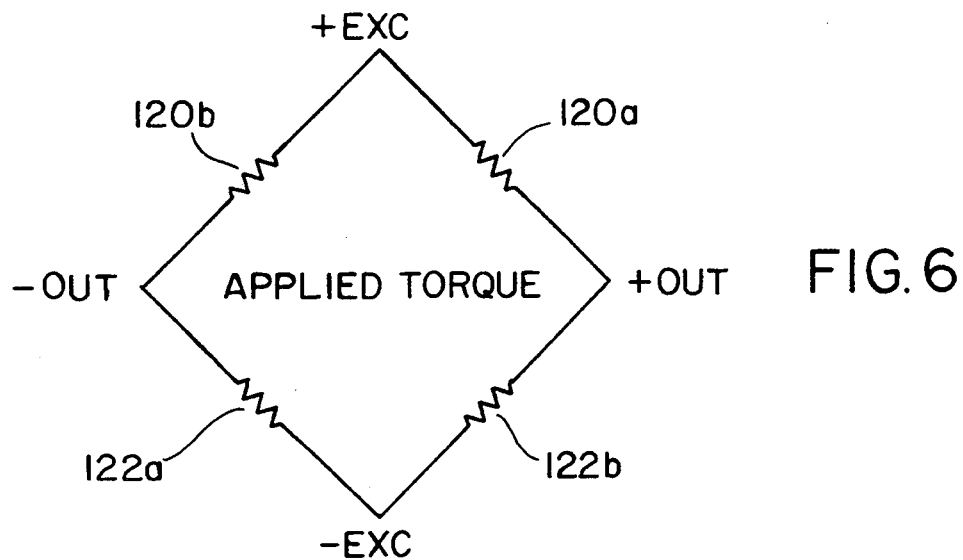
FIG. 6

BOLT TORQUE AND TENSION TRANSDUCER

BACKGROUND

Torque wrenches have been traditionally used to tighten bolts to a desired level of tension. However, a certain amount of torque is required to overcome friction forces and that amount of torque does not get translated into bolt tension. The friction force which usually must be overcome is bolt head friction between the bolt head and surfaces beneath the head. Another influence is thread friction which is the amount of friction between the mating threads of the bolt and a nut.

As a result, the actual tension in the bolt does not generally correlate to the torque applied by the wrench. In order to apply the desired level of tension to the bolt, the amount of torque applied to the bolt must compensate for friction forces. Although lubricants can be applied to the bolt to reduce friction, the amount of torque required to overcome friction remains unknown. Therefore, it is common for bolts to be either over-torqued or under-torqued, which results in the failure of the bolt or in the bolt becoming loose.

The actual amount of torque required to produce a certain level of bolt tension can be determined with a load cell bolt transducer. Generally, a load cell bolt transducer consists of one or more sensing elements which measures torque and tension on the bolt. A single sensing element could be a cylindrical element onto which a series of strain gauges are bonded. The sensing element measures the tension of the bolt as well as thread torque applied to the threads. Thread torque is the amount of torque required to overcome thread friction and to perform mechanical work. By determining the relationship between the separately measured applied torque and the actual tension of the bolt, the correct amount of applied torque for obtaining a certain bolt tension level can be determined.

SUMMARY OF THE INVENTION

A problem with previous load cell bolt transducers is the accuracy of head and thread torque measurements. For example, some current load cell bolt transducers require roller bearings to support the sensing elements thereby adding friction forces to the system. The additional friction forces affect the accuracy of the measurements. Accordingly, there is a need for an apparatus which can accurately measure head torque, thread torque, bolt tension and the torque applied to the bolt.

The present invention provides a transducer including inner and outer cylindrical sensing elements for accurately measuring forces on a bolt.

In preferred embodiments, the inner sensing element is secured to and nested within the outer cylindrical sensing element. A series of strain gauges are affixed to the inner and outer sensing elements. The inner sensing element measures thread torque and bolt tension while the outer sensing element measures the total torque applied to the bolt.

A central cavity extends through the inner and outer sensing elements into which the bolt is inserted. The bolt is tightened about the inner and outer sensing elements with a nut. An enclosure supports and houses the sensing elements with the outer sensing element being secured to the enclosure. Seals between the sensing elements and the enclosure prevent contaminants from entering the transducer. The inner and outer sensing elements do not require support by additional components which might add friction forces to the system and reduce the accuracy of measurements.

In one embodiment, the transducer can be fitted with an adapter within the central cavity to allow the torque and tension measurements to be made on short bolts which do not extend completely through the central cavity.

The present invention transducer provides a simple and inexpensive apparatus and method for accurately measuring the torque applied to a bolt, the tension on the bolt and the thread torque. The head torque is equal to the applied torque minus the thread torque. Torque can be applied to the bolt with a standard wrench. Additionally, the present invention permits friction coefficients to be determined for varying materials, geometries and conditions.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

FIG. 4 is a simplified end view of the outer load cell.

FIG. 5 is a side view of the outer sensing element in which the outer sensing element has been unrolled to show the orientation of the strain gauges.

FIG. 6 is an electrical schematic of the electrical wiring of the strain gauges in the outer sensing element.

DETAILED DESCRIPTION OF THE PREFERRED EMBODIMENTS

Figure 1:
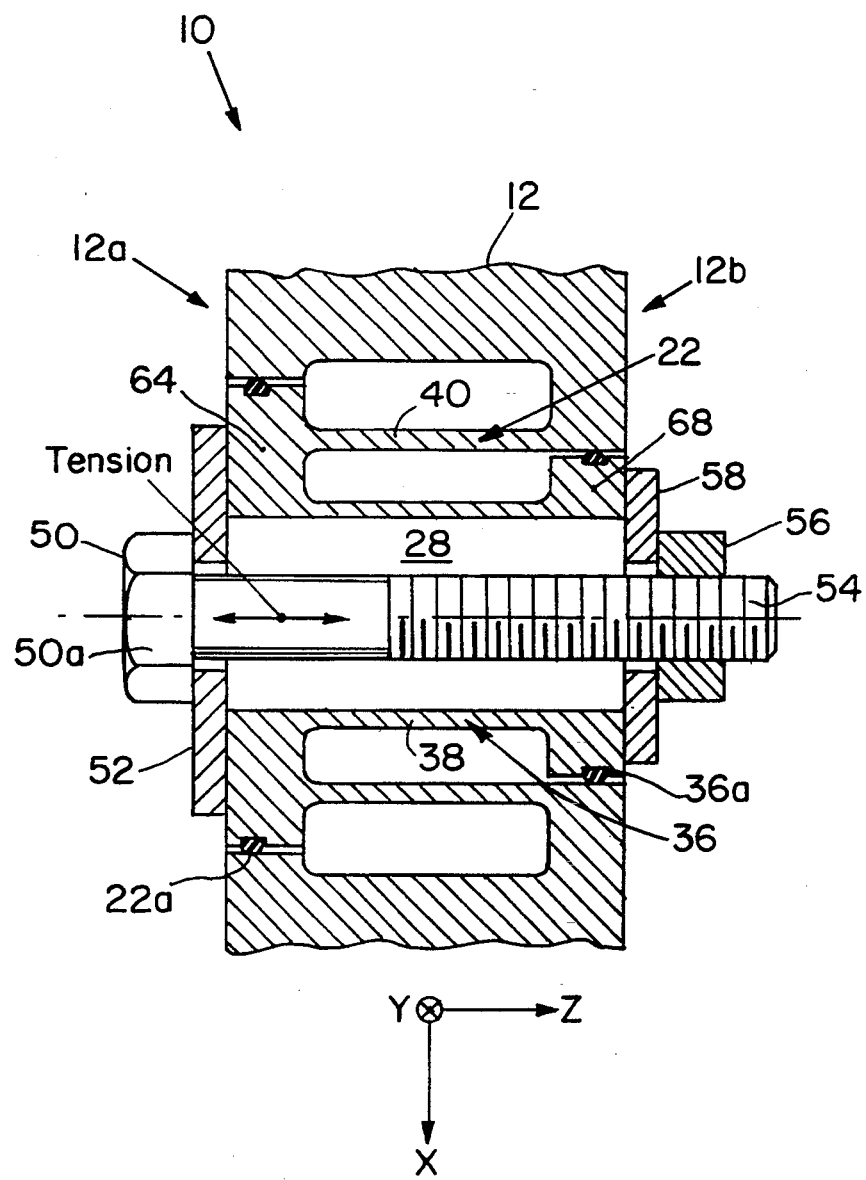
FIG. 1 is a simplified sectional view of the present invention transducer.

In FIG. 1, transducer 10 is a load cell bolt transducer for measuring torques and forces on bolts. Transducer 10 is shown in simplified form to provide clarity in the initial discussion of transducer 10. A more detailed description of the components of transducer 10 is provided in the discussion of FIGS. 2 through 11.

In FIG. 1, transducer 10 includes a base 12 which supports and houses outer sensing element 22 and inner sensing element 36. Seals 22a and 36a prevent contaminants from entering transducer 10. Seals 22a and 36a add negligible friction to the system.

In operation, bolt 50 is inserted through cavity 28 and tightened about transducer 10 with washer 52, washer 58 and nut 56. Bolt 50 can be tightened with a conventional wrench, torque wrench or an electromechanical driver.

Torque applied to bolt head 50a is transmitted to outer sensing element 22 which resists the applied torque. Outer sensing element 22 is secured to base 12 at end 12b which prevents outer sensing element from spinning. Outer sensing element 22 is not secured to base 12 at end 12a and therefore, outer sensing element 22 at end 12a is allowed to twist when subjected to torque. The torque applied to outer sensing element 22 is measured by a first series of strain gauges (described in greater detail below) affixed to cylindrical section 40.

A portion of the torque applied to bolt 50 is required to overcome bolt head friction between head 50a and washer 52. This torque is known as head torque. The remaining torque is thread torque which is transmitted through bolt 50 and tightens nut 56 about threaded portion 54 of bolt 50. The thread torque is transmitted to inner sensing element 36 at flange 68. Inner sensing element 36 is secured to base 12 via outer sensing element 22 which allows the inner sensing element 36 to resist the thread torque. Inner sensing element 36 is secured to outer sensing element at flange 64 but not at flange 68. Therefore, inner sensing element 36 is allowed to twist at end 12b when subjected to thread torque. The thread torque transmitted at flange 68 causes the inner sensing element to twist in the same direction as outer sensing element 22. The thread torque applied to inner sensing element 36 is measured by a second series of strain gauges (described in greater detail below) affixed to cylindrical section 38.

In addition, when bolt 50 is tightened about transducer 10, inner sensing element 36 is compressed. The amount of compression of inner sensing element 36 is measured by a third series of strain gauges affixed to cylindrical section 38 (described in greater detail below). The compression of element 36 is converted into the tension of bolt 50.

The advantage of nesting a cylindrical inner sensing element within a cylindrical outer sensing element is that applied torque, head/thread torque and bolt tension can be simultaneously measured. Additionally, bearings are not required to support the sensory elements. The addition of bearings to the system would add friction and reduce the accuracy of measurements.

In summary, transducer 10 provides measurements for the total applied torque to bolt 50, the thread torque and the tension of bolt 50. The head torque can be computed as the difference between applied torque and thread torque.

A more detailed description of transducer 10 is given below.

Figure 2:
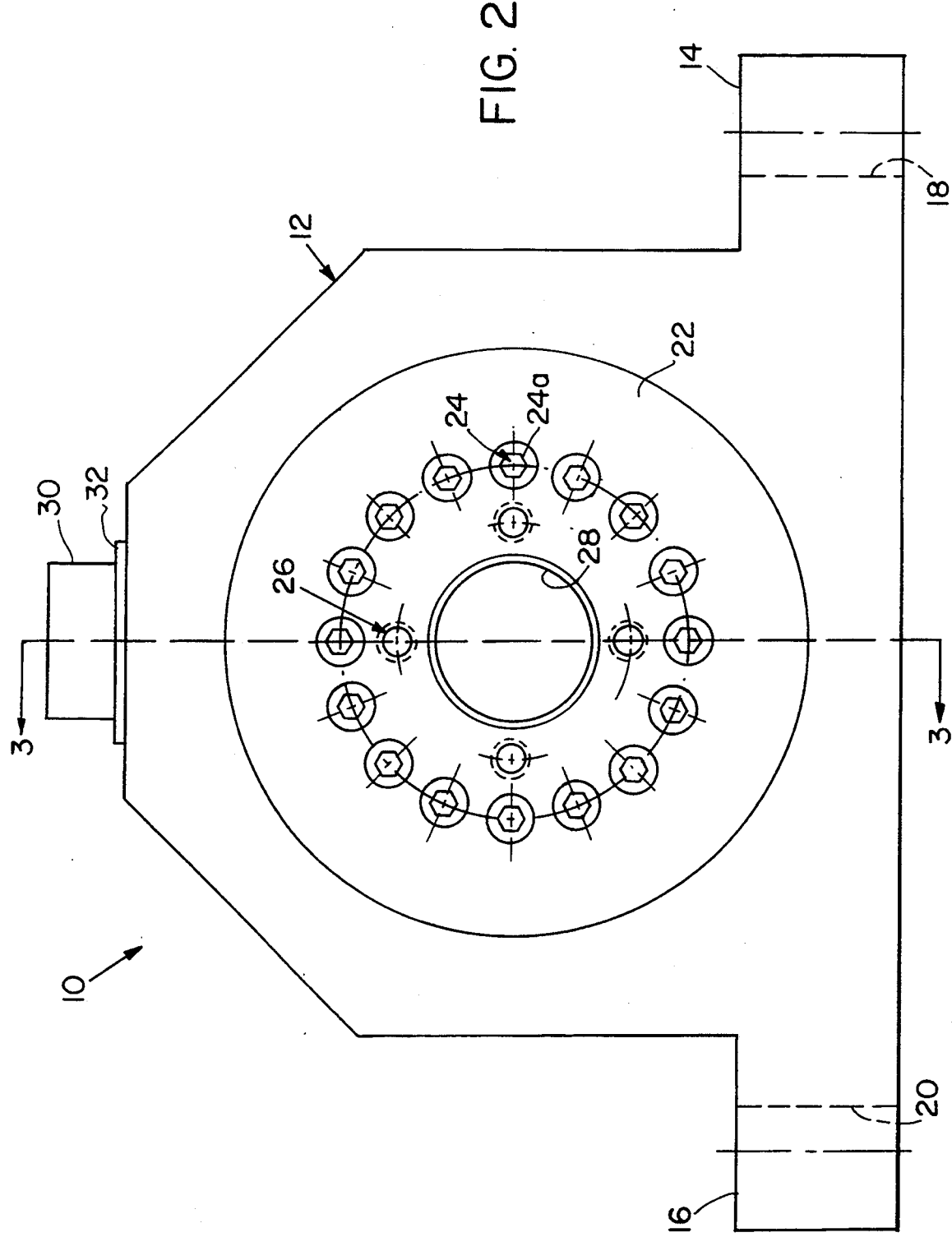
FIG. 2 is a front view of the present invention transducer.
Figure 3:
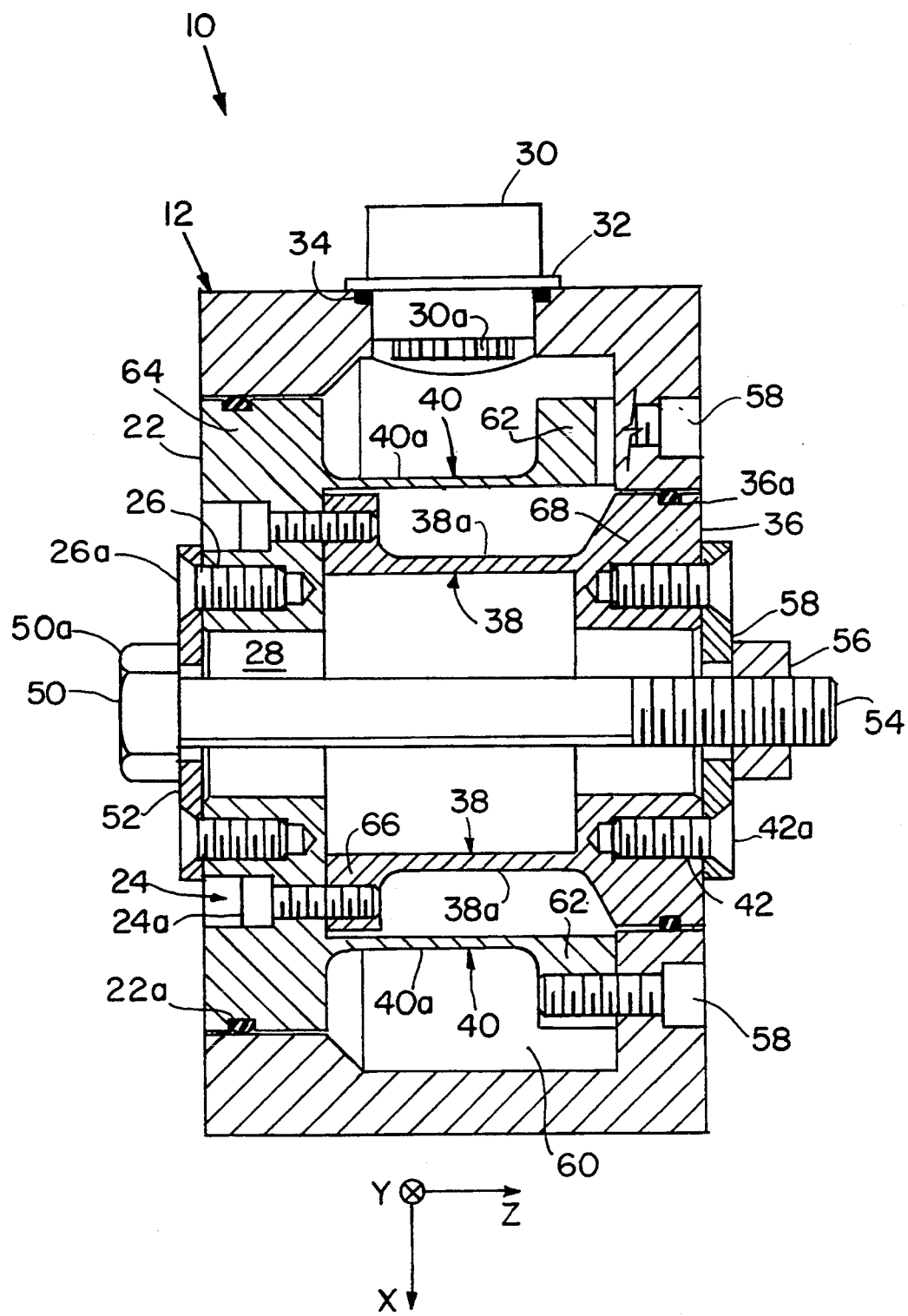
FIG. 3 is a sectional view of FIG. 2 along 3—3.

In FIGS. 2 and 3, base 12 includes ears 14 and 16 having slots 18 and 20. The slotted ears 14 and 16 allow base 12 to be bolted to a fixture or table. Base 12 can also be secured to a fixture or table with a clamp or a vise. In the preferred embodiment, base 12 is made of aluminum. Alternatively, base 12 can be made of other suitable materials such as cast iron or steel.

Outer sensing element 22 is a cylindrical element which occupies the central bore 60 of base 12 and is secured to base 12 at flange 62 by bolts 58. Outer sensing element 22 is sealed to base 12 by seal 22a at flange 64. Seal 22a is a conventional seal such as an O-ring or gasket which prevents contaminants from entering between base 12 and outer sensing element 22 at flange 64.

The outer sensing element 22 has a thin walled cylindrical section 40 between flanges 62 and 64 onto which a series of strain gauges are affixed to the outer surface 40a (as depicted in FIGS. 4 and 5). Outer sensing element 22 senses the amount of torque applied to bolt 50 when bolt 50 is tightened. The thin wall of cylindrical section 40 allows cylindrical section 40 to have a greater twist for a given torque than if cylindrical section 40 was thick walled. Therefore, the strain gauges sense a greater twist for a given torque which improves the accuracy of the torque measurements sensed by outer sensing element 22. Since outer sensing element 22 is the only mechanical part excluding seal 22a between base 12 and bolt head 50a, all applied torque is exerted on sensing element 22. The torque sensed by sensing element 22 is independent of forces exerted on sensing element 22 in the X, Y or Z direction.

Figure 7:
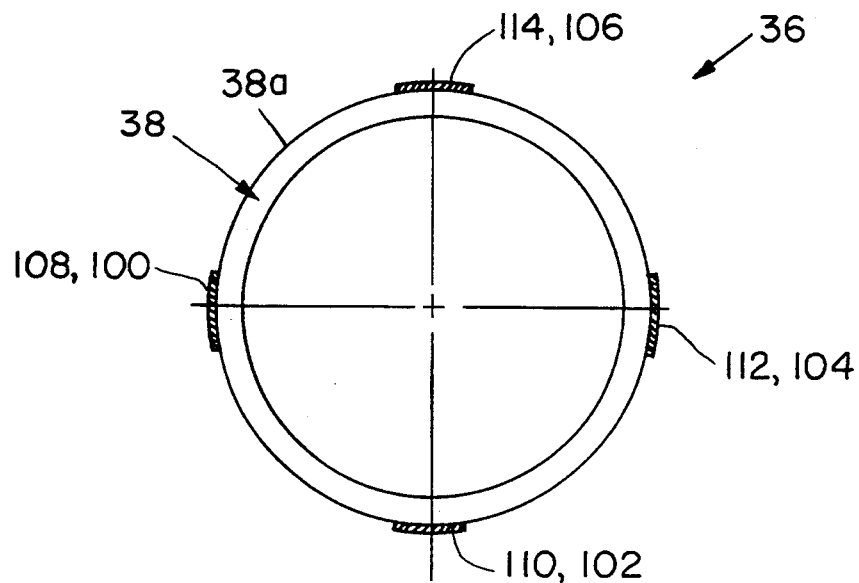
FIG. 7 is a simplified end view of the inner sensing element.

Inner sensing element 36 is nested within outer sensing element 22 and is concentric with outer sensing element 22. Flange 66 of inner sensing element 36 is bolted to flange 64 of outer sensing element 22 by a series of bolts 24a through counter bored holes 24. Inner sensing element 36 is sealed to base 12 by seal 36a at flange 68. Inner sensing element 36 has a thin walled cylindrical section 38 between flanges 66 and 68 onto which a series of strain gauges are affixed to outer surface 38a (as depicted in FIGS. 6 and 7). Inner sensing element 36 senses the amount of tension on bolt 50 as well as the amount of thread torque. The thin wall of cylindrical section 38 improves the accuracy of the measurements by inner sensing element 36 in the same manner as that achieved by outer sensing element 22.

In the preferred embodiment, sensing elements 22 and 36 are made of high strength aluminum or steel. Alternatively, sensing elements 22 and 36 can be made of other suitable materials such as 17-4 PH stainless steel.

Front washer 52 is placed between flange 64 of outer sensing element 22 and head 50a. Washer 52 is secured to outer sensing element 22 by screws 26a and tapped holes 26 in order to prevent washer 52 from rotating. Additionally, rear washer 58 is placed between nut 56 and flange 68 of inner sensing element 36. Washer 58 is secured to inner sensing element 36 by screws 42a and tapped holes 42 in order to prevent washer 58 from rotating. A shallow slot in washer 58 as wide as the flats across nut 56 prevents nut 56 from rotating with respect to washer 58. The prevention of nut rotation is important in order to allow the bolt to be tightened. In this manner, bolt 50 when tightened, compresses outer sensing element 22 and inner sensing element 36.

The material of which washers 52 and 58 are made can vary depending upon the application or conditions which is being tested. For example, the materials for washers 52 and 58 can range from steel, aluminum, brass, bronze, polymers and ceramics. Washers 52 and 58 can also be a bellville spring washer. In the alternative, washers 52 and 58 do not have to be secured to sensing elements 22 and 36.. Additionally, washers 52 and 58 can be omitted.

Electrical connector 30 is sealed to the top of base 12 by flange 32 and seal 34. The strain gauges on sensing elements 36 and 22 are electrically connected to tabs 30a of connector 30 by electrical leads (not shown). Connector 30 allows transducer 10 to be electrically connected to a cable (not shown) which connects transducer 10 to an amplifier. The amplifier conditions the signals from the transducer and provides high-level analog outputs suitable for an A/D converter, computer or other recording instrument. A standard dataacquisition system or three-channel chart recorder can collect the data.

The manner in which the strain gauges are positioned and orientated on outer sensing element 22 is depicted in FIGS. 4 and 5. In FIG. 5, cylindrical section 40 is unrolled to show the orientation of the strain gauges on outer surface 40a. Strain gauge pairs 120 and 122 are bonded to outer surface 40a of thin walled cylindrical section 40 of outer sensing element 22 and are positioned 180 degrees from each other. Strain gauge pair 120 consists of individual strain gauges 120a and 120b. Individual strain gauges 120a and 120b are orientated perpendicular to each other. Strain gauge pair 120 is orientated such that individual strain gauges 120a and 120b are oriented at a 45 degree angle to the longitudinal axis of cylindrical section 40. Strain gauge pair 122 consists of individual strain gauges 122a and 122b which are also oriented at a 45 degree angle to the longitudinal axis of cylindrical section 40. In the preferred embodiment, two strain gauge pairs are affixed to cylindrical section 40. However, the number of strain gauge pairs can be varied and the strain gauge pairs can also be located on other surfaces of outer sensing element 22.

Individual strain gauges 120a, 120b, 122a and 122b of outer sensing element 22 are electrically connected in a wheatstone bridge as depicted in FIG. 6. The purpose for connecting the individual strain gauges in a wheatstone bridge is to cancel out any bending moments or other forces so that an accurate reading can be made. In each strain gauge pair, one individual strain gauge is under tension while the other individual strain gauge is under compression. The resulting measurement of this bridge is the applied torque.

Figure 8:
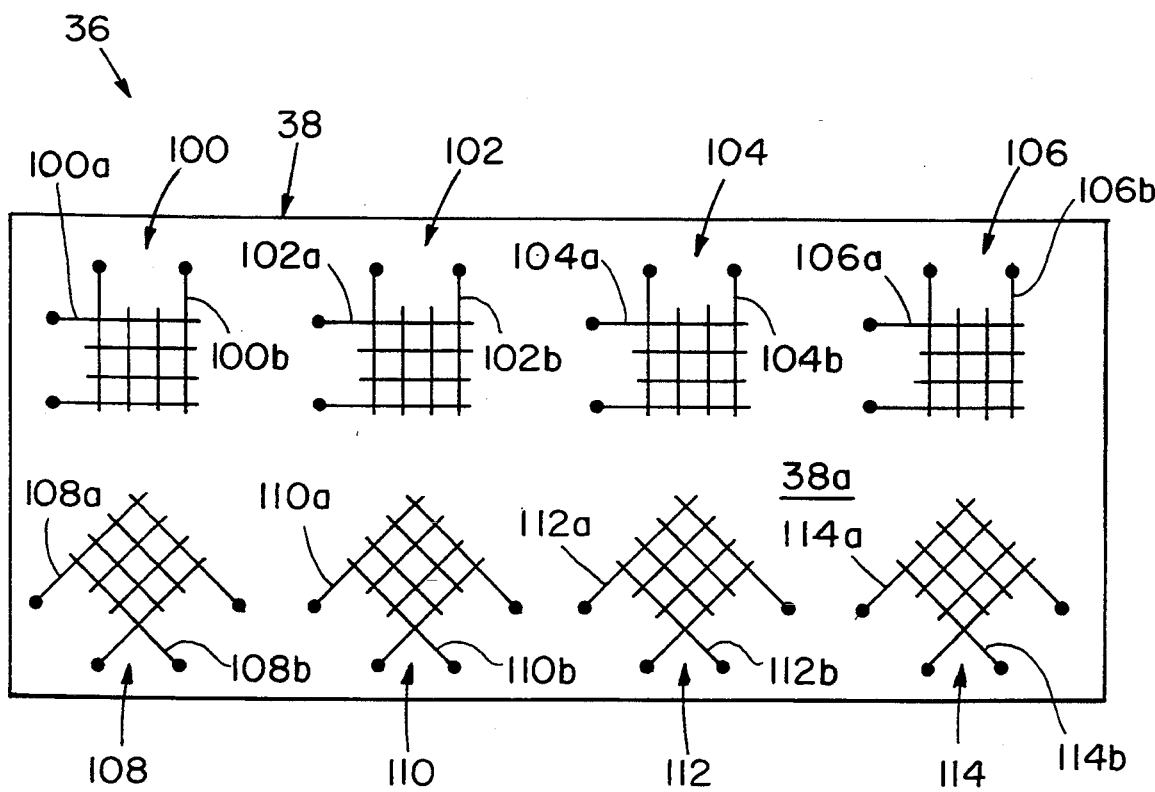
FIG. 8 is a side view of the inner sensing element in which the inner sensing element has been unrolled to show the orientation of the strain gauges.
Figure 9:
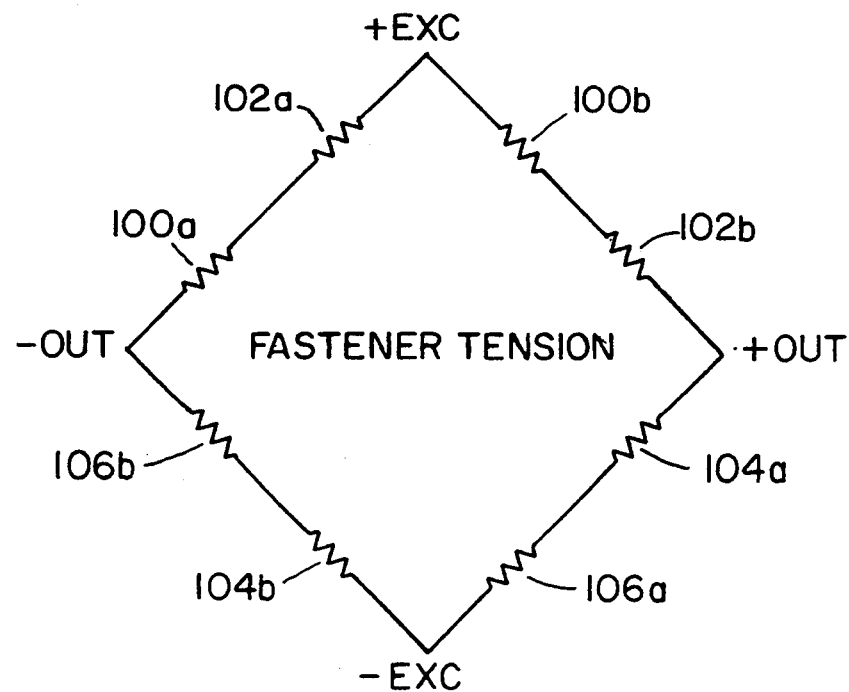
FIG. 9 is an electrical schematic of the electrical wiring of the strain gauges which measure tension in the inner sensing element.

The manner in which the strain gauges are positioned and orientated on inner sensing element 36 is depicted in FIGS. 7 and 8. In FIG. 8, cylindrical section 38 is unrolled to show the orientation of the strain gauges on outer surface 38a. Strain gauge pairs 100, 102, 104 and 106 are positioned 90 degrees apart from each other on outer surface 38a of thin walled cylindrical section 38 of inner sensing element 36. Strain gauge pairs 100, 102, 104 and 106 consist of the following pairs of individual strain gauges: 100a-100b, 102a-102b, 104a-104b, and 106a-106b, respectively. The individual strain gauges in each strain gauge pair are perpendicular to each other. Strain gauge pairs 100, 102, 104 and 106 are oriented such that the individual strain gauges are either along or perpendicular to the longitudinal axis of thin walled cylindrical section 38. Strain gauge pairs 100, 102, 104 and 106 collectively measure the tension on bolt 50 and are electrically connected in a wheatstone bridge as depicted in FIG. 9.

Figure 10:
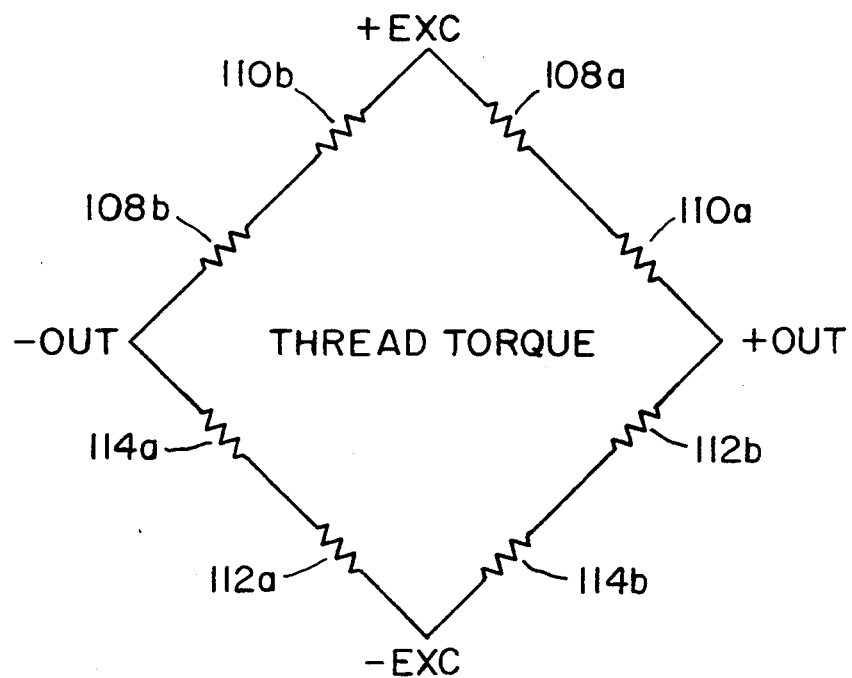
FIG. 10 is an electrical schematic of the wiring of the strain gauges which measure torsion in the inner sensing element.

Strain gauge pairs 108, 110, 112 and 114 are also positioned 90 degrees from each other on cylindrical section 38 and are located below strain gauge pairs 100, 102, 104 and 106 respectively. Strain gauge pairs 108, 110, 112 and 114 consist of the following pairs of individual strain gauges: 108a-108b, 110a-110b, 112a-112b, and 114a-114b, respectively. The individual strain gauges in each strain gauge pair are perpendicular to each other. Strain gauge pairs 108, 110, 112 and 114 are orientated such that the individual strain gauges are at a 45 degree angle to the longitudinal axis of cylindrical section 38. Strain gauge pairs 108, 110, 112 and 114 measure thread torque of bolt 50 (FIG. 3) and are electrically connected in a wheatstone bridge as depicted in FIG. 10.

Although in the preferred embodiment inner sensing element 36 has four strain gauge pairs to measure bolt tension and four strain gauge pairs to measure thread torque, the number of strain gauge pairs can be varied. Furthermore, additional series of strain gauges can be added to both the inner sensing element 36 and outer sensing element 22 for sensing side forces in the x and y directions exerted by a wrench when tightening bolt 50.

The present invention transducer can also be used to determine friction coefficients for various bolt and washer materials, conditions and lubricants. A general relationship between torque applied to bolt 50 and tension on bolt 50 can be given by:

$$T = KDP \tag{1}$$

where
T = applied torque (in lbs.)
K = friction factor
D = nominal bolt diameter (in)
P = induced bolt tension (lb)

Equation (1) can be rearranged to solve for K $$K = \frac{T}{DP} \tag{2}$$

By measuring the applied torque T and tension P with transducer 10 and inserting the values for T, P and D into equation (2), the friction coefficient K can be solved for various materials, geometries or lubricants.

Figure 11:
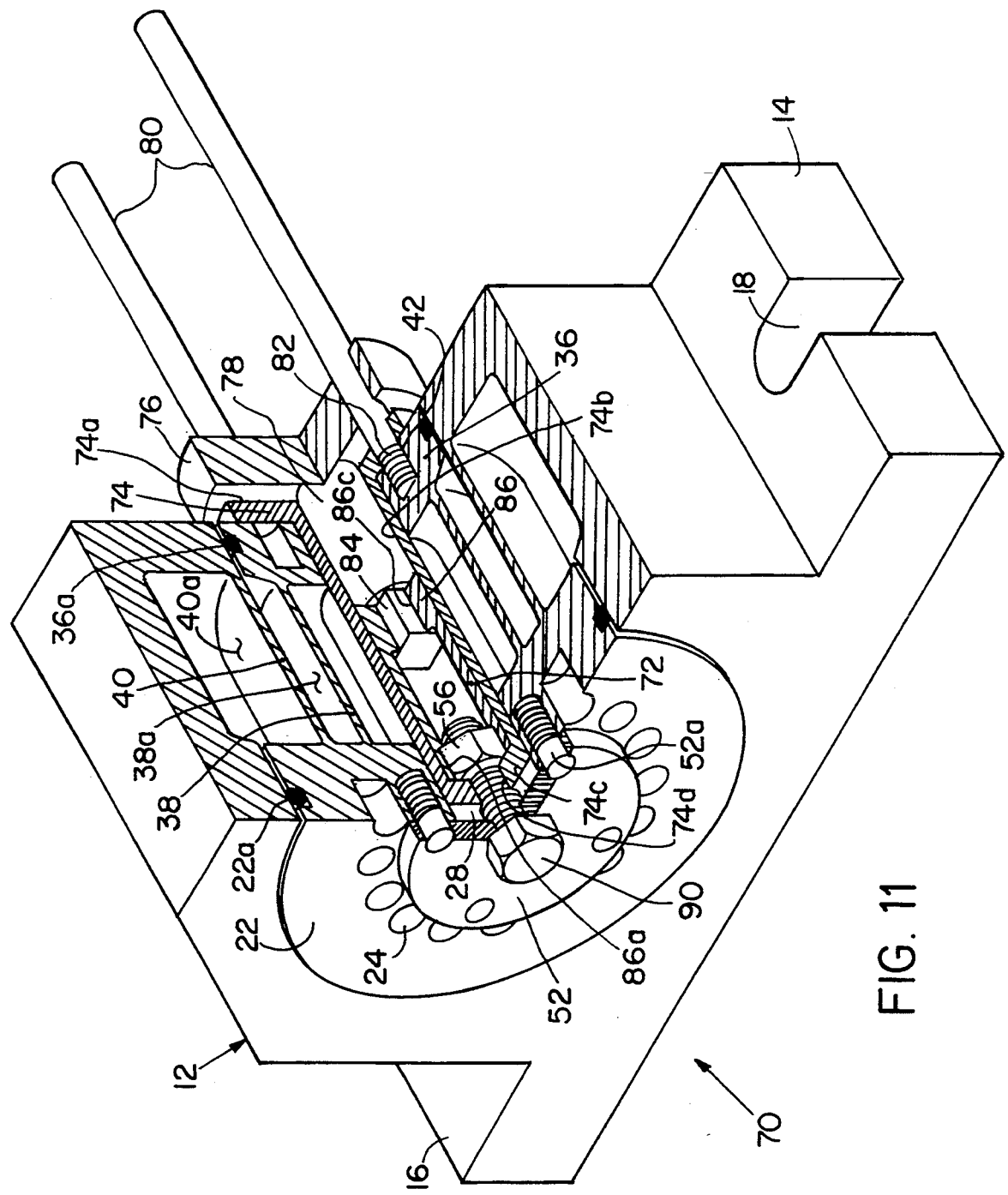
FIG. 11 is an isometric view of a preferred embodiment of the present invention.

FIG. 11 depicts another preferred embodiment, transducer 70, for measuring torque and tension on a short bolt 90 which does not extend through central cavity 28 of transducer 70. Transducer 70 is similar to transducer 10 except that transducer 70 has been adapted to measure torque and tension on short bolts.

Adaptor 74 fits within cavity 28. Adaptor 74 has a flange 74a, a hollow cylindrical portion 74b and an end wall 74c. Bolt 90 passes through hole 74d in end wall 74c. Nut 56 is tightened on bolt 90 against end wall 74c. Insert 86 is a hollow cylindrical member which slides within adaptor 74. Hexagonal hole 86a fits around nut 56 to prevent nut 56 from rotating. Insert 86 in turn is prevented from rotating by locking hub 76. Locking hub 76 has a cylindrical portion 78 which fits within hollow cylindrical portion 74b of adapter 74. Cylindrical portion 78 terminates in a square lug 84 which fits within square hole 86c of insert 86 to lock insert 86 in place. Locking hub 76 and adaptor 74 are locked in place to inner sensing element 36 by rods 80. Rods 80 have a threaded portion 82 and are screwed into tapped holes 42.

Additionally, a rotary position sensor can be mounted on the transducer to provide torque and tension data in relation to bolt rotation. The sensor can be a servo potentiometer which provides a high level analog signal corresponding to the input rotation of the screw.

Equivalents

While this invention has been particularly shown and described with references to preferred embodiments thereof, it will be understood by those skilled in the art that various changes and form and details may be made therein without departing from the spirit and scope of the invention as defined by the dependent claims.

The invention claimed is:

1. A transducer for measuring torque and tension applied to a bolt comprising:

an inner cylindrical sensing element for measuring partial torque forces; and an outer cylindrical sensing element for measuring applied torque forces, the partial torque forces being a component of the applied torque forces, the inner sensing element being nested within the outer sensing element, the inner and outer sensing elements being secured to each other only at one end.

2. The transducer of claim 1 in which the inner cylindrical sensing element measures torque and bolt tension.

3. The transducer of claim 1 in which the inner and outer sensing elements measure side forces applied to the bolt.

4. The transducer of claim 1 in which the partial torque is thread torque.

5. The transducer of claim 1 further comprising a seal between the inner sensing element and an enclosure for preventing contaminants from entering the transducer.

6. The transducer of claim 1 further comprising a seal between the outer sensing element and an enclosure for preventing contaminants from entering the transducer.

7. The transducer of claim 1 further comprising a central cavity extending through the inner and outer sensing elements into which the bolt which is being tested is inserted.

8. The transducer of claim 7 further comprising an adaptor secured within the central cavity for enabling the measuring of torque and tension on short bolts.

9. The transducer of claim 8 in which the adaptor comprises:
a first hollow sleeve for applying pressure on the inner sensing element, the first sleeve having an end wall to which the bolt can be secured by a nut;
a second hollow sleeve within the first sleeve for locking the nut in place; and
a locking hub secured to the inner sensing element for locking the second sleeve in place.

10. The transducer of claim 1 further comprising strain gauges affixed to the inner and outer sensing elements.

11. A transducer for measuring torque and tension applied to a bolt comprising:
an inner cylindrical sensing element for measuring partial torque and bolt tension;
an outer cylindrical sensing element for measuring torque applied to the bolt, the partial torque being a component of the applied torque, the inner sensing element being nested within the outer sensing element, the inner and outer sensing elements being secured to each other only at one end, a central cavity being within the inner and outer sensing elements into which the bolt which is to be tested is inserted; and
an enclosure for supporting and housing the sensing elements.

12. The transducer of claim 11 in which the inner and outer sensing elements measure side forces applied to the bolt.

13. The transducer of claim 11 in which the partial torque is thread torque.

14. The transducer of claim 11 further comprising strain gauges affixed to the inner and outer sensing elements.

15. The transducer of claim 11 further comprising a seal between the inner sensing element and the enclosure for preventing contaminants from entering the transducer.

16. The transducer of claim 11 further comprising a seal between the outer sensing element and the enclosure for preventing contaminants from entering the transducer.

17. The transducer of claim 11 further comprising an adaptor secured within the central cavity for enabling the measuring of torque and tension on short bolts.

18. The transducer of claim 17 in which the adaptor comprises:
a first hollow sleeve for applying pressure on the inner sensing element, the first sleeve having an end wall to which the bolt can be secured by a nut;
a second hollow sleeve within the first sleeve for locking the nut in place; and
a locking hub secured to the inner sensing element for locking the second sleeve in place.

19. A method of measuring torque and tension exerted on a bolt comprising:
tightening the bolt with a nut about a cylindrical inner sensing element and a cylindrical outer sensing element, the bolt having a bolt head, the inner sensing element being nested within the outer sensing element, the bolt being inserted within a central cavity within the inner and outer sensing elements;
measuring torque applied to the bolt with the outer sensing element; and
measuring partial torque with the inner sensing element, the partial torque being a component of the applied torque force.

20. The method of claim 19 further comprising measuring tension of the bolt with the inner sensing element.

21. The method of claim 19 in which the partial torque is thread torque.

22. The method of claim 21 further comprising determining the torque required to overcome friction under the bolt head by determining the difference between the applied torque and the thread torque.

23. The method of claim 20 further comprising providing an adaptor with the central cavity for measuring torque and tension on short bolts which do not extend completely through the central cavity.

24. A transducer for measuring torque and tension applied to a bolt comprising:
an inner cylindrical sensing element for measuring partial torque forces; and
an outer cylindrical sensing element secured to the inner sensing element for measuring applied torque forces, the partial torque forces being a component of the applied torque forces, the inner sensing element being nested within the outer sensing element;
a central cavity extending through the inner and outer sensing elements into which the bolt which is being tested is inserted; and
an adaptor secured within the central cavity for enabling the measuring of torque and tension on short bolts.

25. The transducer of claim 24 in which the adaptor comprises:
a first hollow sleeve for applying pressure on the inner sensing element, the first sleeve having an end wall to which the bolt can be secured by a nut;
a second hollow sleeve within the first sleeve for locking the nut in place; and
a locking hub secured to the inner sensing element for locking the second sleeve in place.

26. A transducer for measuring torque and tension applied to a bolt comprising:

an inner cylindrical sensing element for measuring partial torque and bolt tension;

an outer cylindrical sensing element for measuring torque applied to the bolt, the partial torque being a component of the applied torque, the inner sensing element being nested within the outer sensing element, the inner and outer sensing elements being secured to each other, a central cavity being within the inner and outer sensing elements into which the bolt which is to be tested is inserted;

an enclosure for supporting and housing the sensing elements; and an adaptor secured within the central cavity for enabling the measuring of torque and tension on short bolts.

27. The transducer of claim 27 in which the adaptor comprises:

a first hollow sleeve for applying pressure on the inner sensing element, the first sleeve having an end wall to which the bolt can be secured by a nut;

a second hollow sleeve within the first sleeve for locking the nut in place; and a locking hub secured to the inner sensing element for locking the second sleeve in place.

* * * * *